United States Patent Office 3,026,220
Patented Mar. 20, 1962

3,026,220
ALUMINUM PIGMENTS AND FIBERS
Donald M. Sowards, Claymont, Del., assignor to E. I. du Pont de Nemours and Company, Wilmington, Del., a corporation of Delaware
No Drawing. Filed Dec. 1, 1959, Ser. No. 856,385
3 Claims. (Cl. 148—6.1)

This invention is concerned with aluminum pigments and fibers, and is more particularly concerned with a process for coloring aluminum powder or fibers, and with the resulting colored pigments and colored fibers. This application is a continuation-in-part of my copending application Serial No. 625,599, filed December 3, 1956, now abandoned.

When the metallic color of aluminum is desirable, or is not objectionable, aluminum powder is an excellent pigment for use in paints and lacquers, since these are suitable for use as finishes on a wide variety of surfaces to provide covering power, sealing, heat resistance and durability to weathering and chemicals which are unsurpassed. However, attempts to color such compositions to produce pigment grade materials have been unsuccessful.

It is known that thick oxide coatings which are sufficiently porous to serve as a base for coloring materials can be formed on sheet aluminum by anodic or chemical treatment. The anodizing treatment, in which the aluminum is made the anode in an electrolytic acid bath, is not suitable for use with aluminum powder or fibers. Chemical treatments with alkaline chromate solutions at 90–100° C. have been used to form oxide coatings of sufficient thickness and porosity for subsequent coloring. These oxide coatings can be treated with metal salts forming colored inorganic compounds in the coloring operation, but the colors obtained in this way are limited. Oxide coatings can also be colored by treatment with an acidic solution of an acid-mordant dye or by treatment with a mordanting agent, such as tannic acid, followed by treatment with an acid salt of a basic dye, but the colors obtained are unsatisfactory, particularly with respect to light-fastness. Moreover, the treatment required attacks the surface of the aluminum to such an extent that it is not suitable for preparing satisfactory aluminum pigments or fibers.

It would be highly desirable to have a satisfactory process for applying a wide variety of durable and light-fast colors to aluminum powder, fibers and like materials having surface areas which are quite large relative to the weight of the aluminum. Commercially available materials of this type include aluminum powders suitable for pigments use having no dimension in excess of 0.01 inch, flake or flitters of thicknesses up to 0.002 inch and having no dimension in excess of 0.125 inch, fibrils having maximum dimensions of up to 0.002 x 0.08 x 0.6 inch, and fibers having filament diameters up to 0.01 inch. Cross-sectional areas measured in planes perpendicular to the maximum dimension of the above in no case exceeds $3 \times 10^{-4}$ square inch and, therefore, these materials have great surface area relative to their mass. For simplicity the term "aluminum particles" will be used hereinafter to refer to such materials.

It is an object of this invention to provide a novel process which is suitable for coloring aluminum particles. Another object is to provide aluminum pigments of any desired color which retain the desirable properties of conventional uncolored aluminum pigments when used in paints and lacquers but are more readily suspended in the vehicle. A further object is to provide colored aluminum fibers, fibrils or flake of any desired color. Other objects will become apparent from the following specification and claims.

In accordance with this invention, aluminum particles (powder, flake, fibrils or fibers) are activated by a chemical treatment which removes impurities and leaves only an incipient coating of hydrous aluminum oxide or aluminum hydroxide with minimum attack of the aluminum metal, the treatment being stopped when the weight of this oxide coating is less than about 1% of the weight of the aluminum particles. The activated aluminum particles are subsequently treated in an aqueous bath in the presence of coloring material at pH 6 to 9.5 and 55° to 95° C. to grow an adherent transparent to translucent colored coating on the surface of the aluminum particles, the coloring material being enclosed in the coating as it is produced. Preferably the length of these two treatment steps is such that the weight of the incipient coating produced in the activation treatment is less than 20% of the colored coating produced by the subsequent treatment. Under these conditions the aluminum reacts with water to form a colored film having colored material dispersed throughout and firmly bound and sealed in the film. Abrasion-resistant colored particles are produced which have a reflecting core of unchanged aluminum and a corrosion resistance superior to that of untreated aluminum particles.

Highly useful colored products are obtained in this way from any of the commercially available forms of aluminum powder, flitters (flake), fibrils and fibers. The colored pigments have a predominantly oxide surface, and the technology for using conventional uncolored aluminum powder is directly applicable to these colored pigments because of the similar nature of the surfaces of the materials, whereas particles prepared by applying coloring material to a preformed coating have predominantly a surface composed of adsorbed coloring material. The colored aluminum fibers are useful for decorative purposes, and for coding in electrical applications. The coated fibers have improved corrosion and abrasion resistance and, when used as electrical conductors, the coating serves as an electrical insulator. The coatings may also improve the compatibility of the fiber with the medium in which it is used.

Finely-divided water-insoluble dyes or water-soluble dyes used in the textile trade for direct (substantive) dyeing of cotton from a neutral or mildly alkaline bath are suitable for use as coloring materials in the process of this invention. The colors and shades of colored aluminum particles obtainable are comparable to those obtained by printing or dyeing textiles with dyes. It is especially surprising to find that good results are obtained with suspensions of water-insoluble dyes. This makes possible the use of organic pigment dyes characterized by unusually good light-fastness and high tinctorial strength to prepare colored aluminum particles which have outstanding durability to outdoor weathering. It also makes possible the preparation of colored products which are thermally stable even above 250° C., which are resistant to chemical bleaching, and which do not bleed into vehicles which are neutral with respect to acidity, even during prolonged storage.

A wide variety of products are obtainable, depending upon the nature of the aluminum particles treated and the dye used. It has also been found that the quality and appearance of the product varies markedly with the activation treatment used and the concentration and temperature of the dye bath. A system of indicating these differences is necessary in order to understand the full significance of the subsequent disclosure.

The over-all color effect will be indicated by reference to the Munsell Book of Color, Pocket Edition 1929–1942 (Munsell Color Company, Inc., Baltimore, Maryland). This comparison is intended only as an indication of the mass color effect of the pigment or finish when viewed in a normal direction, and does not indicate the unique metallized and two-tone appearance.

The products may also vary in quality from a material consisting only of aluminum particles which are uniformly colored over the entire surface to materials containing various proportions of unevenly colored aluminum particles, uncolored aluminum particles, oxide particles containing no aluminum metal, and unattached agglomerates of dyes. The following definitions of quality will be used hereinafter:

A good quality product designates one composed of at least 90% uniformly colored aluminum particles, the color being sufficient to hide the metal, and which, in the case of the colored powder, is easily processed for preparation of pigmented finishes having desirable color characteristics.

A fair quality product designates one showing less desirable color characteristics but otherwise being of good quality, e.g., the applied color does not effectively hide the color of the metal even though the aluminum particles are uniformly dyed. This deficiency can frequently be corrected by increasing the concentration of the dye bath to increase the dominating character of the applied color, and may also be improved by adjusting other treatment conditions.

A poor quality product designates one containing less than an estimated 50% of colored aluminum particles, which are generally colored on only a portion of the surface, with the remainder of the product consisting of uncolored aluminum particles, colored and uncolored oxide particles, and unattached coloring material. This condition results when an inadequate activation treatment is used.

The aluminum particles to be activated should be clean and free from materials which interfere with the activation. Commercially available aluminum powder should be degreased with a suitable solvent, such as benzene or acetone, and further cleaning may be desirable with a dilute acid or alkaline solution under conditions that will remove any oxide which attaches impurities to particle surfaces without appreciable attack on the aluminum metal. The clean particles are preferably activated in a dilute aqueous alkaline peroxide solution maintained at about pH 11 and at a temperature of 0° to 40° C., room temperature being generally suitable. Any convenient source of peroxide can be used, e.g., hydrogen peroxide, alkali metal peroxides or perborates. The pH is most easily maintained at the optimum value by use of a buffering agent such as alkali metal carbonates, phosphates or borates, or combinations of such agents. Depending upon the quality of product required, the peroxide can be omitted from the activation treatment.

Although considerable variation in the activation treatment is possible, the different treatments are by no means equivalent in the results achieved. When the peroxide is omitted from the treatment, the subsequent dyeing operation is most unsatisfactory and poor quality products are obtained, as illustrated in Examples 21 and 22. When the aqueous alkaline peroxide treatment is included but no buffering agent is present, uniformity of activation is not obtained, the optimum dyeing conditions become more critical, and only a fair quality product is obtained (Example 23). Different buffers do not give equivalent results in the peroxide treatment. Sodium carbonate is the preferred buffer. Good quality products can be obtained when other buffers are used, as illustrated in Examples 6 and 9, but the dyeing operation is more difficult to control, the conditions necessary to obtain a good quality product are more critical and differ with the different buffers, and it is difficult to obtain deeply colored pigments. The best results are obtained with an aqueous alkaline peroxide bath which contains peroxide equivalent to about ½ to 2% of hydrogen peroxide and 2 to 4% of sodium carbonate, and is used in the proportion of 30 to 100 parts of bath to 1 part by weight of aluminum particles.

The treatment should be stopped when the aluminum has been activated sufficiently and before substantial oxidation of the aluminum has occurred, usually in the interval of 5 to 15 minutes. This treatment will produce an oxide coating which is less than 20% of that obtainable by the subsequent treatment in hot water. The activated particles are then recovered from the bath and rinsed with water to remove the peroxide solution. The effect of the activation is lost if the particles are stored for an appreciable time, either wet or dry, and the desired color film will not develop. Preferably, the activated particles are added to the dye bath immediately or at least within a few hours, during which time they are maintained wet at room temperature or below. Treatment with dilute nitric acid of greater than ½% concentration will help preserve the particles in an active condition until they are added to the dye bath.

The dye bath preferably contains 0.03 to 0.3% of organic dye in solution, or 0.1 to 3.0% in suspension, in an aqueous bath at a pH of about 9. Although any treatment temperature within the range of 55° to 95° can be used with suitable control of the time of treatment, a temperature is preferably used which will give effective treatment in about 5 to 20 minutes. For the finely-divided aluminum powders used for preparing pigments, which have quite large surface areas relative to the weight of metal and react very rapidly, the temperature of the bath is preferably 65° to 75° C. and temperatures as low as 55° may sometimes be desirable. Higher temperatures of 80° to 90° C. are preferable for fibers and fibrils, which have smaller ratios of surface area to weight of metal.

The particles of activated aluminum are agitated in the dye bath until all of the dye present is fixed or until the desired intensity of color is obtained. It is preferable to avoid an excess of dye in the dye bath, because this simplifies recovery of the product, but excess dye can readily be removed by washing the product on a suitable filter. Treatment for 15 minutes is generally sufficient to develop maximum coloration and seal the coating on the particles against loss of dye. When the particles are treated at 55°–65° CC. for a short length of time, it is sometimes desirable to add a subsequent treatment in a bath of water maintained at 70°–80° C. for 15 minutes in order to seal the dye into the coating. The coating can also be sealed by soaking the particles in a hot aqueous bath containing ½% nickel acetate.

After dyeing, the colored particles are rinsed with water and dried. Rinsing with acetone, alcohol or a similar agent facilitates drying to a free-flowing powder suitable for direct use as a pigment. However, even if the pigment is allowed to cake or form lumps, the colored coating is so durable that the pigment can be ground to a readily dispersible powder without damage. The coating not only protects the particles but also has the property of facilitating dispersion of the particles in uniform suspension in a vehicle so that dispersing agents are not needed, the dispersibility being much better than would be expected from the tests based on fineness of subdivision which have been used to evaluate conventional pigments. The more finely divided colored aluminum particles have greater dispersibility, however, and screening may be employed when a product having maximum dispersibility is desired. The pigment produced by the above treatment is of the nonleafing variety; however, leafing characteristics may be restored by conventional means of adding leafing agents to uncolored aluminum pigment, i.e., treatment with a leafing agent, such as stearic acid, in a polishing drum or by sorption from a suitable solvent, such as benzene or acetone.

The pigment is suitable for mixing with bronzing liquids, for the same purposes as ordinary aluminum powder or flitters are used, to provide desirable colors and improved dispersibility. It is also useful for the purposes for which colored pigments in general are used. When the pigment is added to a clear or transparent or colored pyroxylin or methyl methacrylate base lacquer or a resin base finish, a pigmented lacquer or paint results which produces a beautiful metallized and two-tone effect on surfaces to which it is applied. Attractive finishes having an unusually high degree of covering power are obtained when these lacquers or paints are brushed or sprayed onto wood, paper or metal surfaces.

The following examples, in which parts are by weight, illustrate specific embodiments of the invention:

*Example 1*

Aluminum powder in the form of lamellar particles of a fineness passing 98½% through a 325 mesh screen and of an average particle size of about 0.5 micron in thickness was used. The powder was cleaned by washing for 30 minutes with benzene, treating for 4 minutes with a 0.1% aqueous solution of sodium hydroxide, treating for 2 minutes with a 1% aqueous solution of nitric acid and rinsing thoroughly with water. The clean moist powder was activated by suspending it for 5 minutes in a bath consisting of an aqueous solution of sodium carbonate and hydrogen peroxide containing 3% sodium carbonate and ½% hydrogen peroxide. Fifty parts bath to each 1 part aluminum powder were used. The bath was filtered to recover the activated powder and the particles were rinsed with water to remove the residual bath. Based on the aluminum content of the powder added to this bath, the activated particles contained more than 99% aluminum and less than 1% of aluminum oxide in the form of hydrated aluminum oxide or aluminum hydroxide.

The moist activated particles were agitated in an aqueous bath, adjusted to pH 9 with sodium hydroxide and maintained at 70° C. for 5 minutes, using about 1 part of activated particles (based on the dry weight) to 25 parts of aqueous bath. The treated particles were then recovered from the bath, rinsed with water followed by acetone, and dried to free-flowing powders.

In the subsequent examples the same procedure was followed except that a dye bath was used for the hot aqueous treatment at pH 9, the activated particles being treated, unless otherwise specified, for 5 to 15 minutes at 70° C. with dye baths containing 0.1% of the designated dye and adjusted to pH 9 with sodium hydroxide or acetic acid.

The weight of coating produced on the aluminum particles by the treatment was determined by A.S.T.M. Method B-137-45, as described in the 1952 Book of Standards, Part 2, pages 559-560, in which the coating is removed with an aqueous solution of 20 gm. of chromic acid and 35 ml. of 85% phosphoric acid in 1000 ml. of water. This determination indicated the weight of the undyed coating produced in accordance with Example 1 to be 20 to 25% of the total weight of the pigment. For the dyed coatings produced in accordance with the following examples, coating weights of 8 to 12% of the total weight of the colored pigment were indicated and a broader range of 1 to 20% coat weights was useful for particular color effects.

*Example 2*

The procedure described in Example 1 was followed, except that a dye bath was used for the hot aqueous treatment which contained a finely divided suspension of the dye, dichloroisodibenzanthrone, of Colour Index No. 1104 (C.I. 1104). A good quality aluminum pigment of excellent color properties was obtained. The color was evaluated by visual comparison with color samples in the Munsell Book of Color, Pocket Edition, 1929-1942 (Munsell Color Company, Inc., Baltimore, Maryland). The color of the pigment produced corresponded to Munsell color 90.0, 4/4 (purple red-purple) when painted in a clear binder.

*Example 3*

The same procedure was followed, but using a dye bath containing a finely divided suspension of monochloroindanthrone (C.I. 1112). A good quality aluminum pigment was produced which corresponded to Munsell color 72.5, 4/4 (bluish purple-blue) when painted in a clear binder.

*Example 4*

The same procedure was followed, using a dye bath containing a finely divided suspension of alpha-(2-nitro-p-tolylazo)acetoacetanilide, a dye corresponding to Prototype No. 103 (Pr. 103) of the American Association of Textile Chemists and Colorists, "Technical Manual and Yearbook." A fair quality aluminum pigment was produced which corresponded to Munsell color 30.0, 5/2 (yellow green-yellow).

*Example 5*

The same procedure was followed, using a dye bath containing a finely divided suspension of copper phthalocyanine (Pr. 481). A good quality aluminum pigment was produced which corresponded to Munsell color 67.5, 4/4 (purplish-blue) when painted in a clear binder.

*Example 6*

The procedure described in Example 1 was followed except that 5% disodium hydrogen phosphate was substituted for the 3% sodium carbonate in the activation bath and the activated aluminum particles were treated in a 78° C. aqueous dye bath containing 0.4% of a finely divided suspension of copper phthalocyanine (Pr. 481). A good quality of aluminum pigment was produced which corresponded to Munsell color 55.0, 6/4.

*Example 7*

The same procedure described in Example 1 was followed except that a dye bath was used for the hot aqueous treatment which contained a finely divided suspension of copper polychlorophthalocyanine (Pr. 483). A good quality aluminum pigment was produced which corresponded to Munsell color 47.5, 5/2 (bluish-green) when painted in a clear binder.

*Example 8*

Aluminum flitter flake (United States Bronze Powder Works No. 16/48) was treated as in Example 1 except that a dye bath was used for the hot aqueous treatment which contained 0.4% of a finely divided suspension of copper polychlorophthalocyanine (Pr. 483). A good quality colored flitter flake was obtained which corresponded to Munsell color 55.0, 7/4.

*Example 9*

The procedure described in Example 1 was followed except that 3% sodium perborate tetrahydrate was substituted for the sodium carbonate and hydrogen peroxide in the activation bath and the activated aluminum particles were treated in a 62° C. aqueous dye bath containing 0.4% of finely divided suspension of copper polychlorophthalocyanine (Pr. 483). A good quality of aluminum pigment was produced which corresponded to Munsell color 70.0, 4/4.

*Example 10*

The procedure described in Example 1 was followed except that a dye bath was used for the hot aqueous treatment which contained a solution of the dye obtained by condensing (Amino G acid→cresidine) with 4,4'-dinitro-2,2'-stilbene di-sodiumsulfonate. A good quality aluminum pigment was produced which corresponded to Munsell color 2.5, 4/4 (purplish red).

*Example 11*

The same procedure was followed, using a dye bath containing a solution of the dye (Pr. 47) having a structure defined as follows:

Salicylic acid←benzidine→(2-amino-phenol-4-sodium sulfonate→resorcinol, coppered)

A fair quality brown aluminum pigment was produced.

Example 12

The same procedure was followed, using a dye bath containing a solution of the dye (C.I. 353) having a structure defined as follows:

The phosgenated derivative of 5-nitro-2-aminobenzene sodium sulfonate→gamma acid, reduced A fair quality aluminum pigment was produced which corresponded to Munsell color 5.0, 4/2 (red) when painted in a clear binder.

Example 13

The same procedure was followed, using a dye bath containing a solution of the dye (C.I. 278)

$$NaO_3S-\underset{}{\bigcirc}-N=N-\underset{}{\bigcirc}-N=N-\underset{NaO_3S-}{\overset{OH}{\bigcirc\bigcirc}}-NHCO-\bigcirc$$

A good quality aluminum pigment was produced which corresponded to Munsell color 95, 4/6 (red purple).

Example 14

Example 13 was repeated, but using a dye bath which contained twice the concentration of the dye (C.I. 278). A good quality of aluminum pigment was produced which corresponded to Munsell color 92.5, 5/2.

Example 15

The procedure described in Example 1 was followed, using a dye bath for the hot aqueous treatment which contained a solution of the dye (Pr. 277) defined as a copper complex of the product obtained by diazotizing 6-nitro-4-methoxy-metanilic acid followed by coupling to 2-naphthol-6-sulfonic acid followed by reduction and phosgenation. A good quality aluminum pigment was produced which corresponded to Munsell color 85, 6/2 (purple).

Example 16

The same procedure was followed, using a dye bath containing a solution of the dye H acid→1-naphthylamine→J acid→H acid disclosed in Example II of U.S. Patent No. 1,788,797, issued January 13, 1931. A fair quality aluminum pigment was produced which corresponded to Munsell color 72.5, 4/2 (bluish purple-blue) when painted in a clear binder.

Example 17

The same procedure was followed, using a dye bath containing a solution of the dye (C.I. 539) having a structure defined as follows:

Mixed Cleve's acid←p-nitroaniline, reduced→
    gamma acid→m-phenylenediamine

A good quality aluminum pigment was produced which corresponded to Munsell color 77.5, 5/2 (purplish purple-blue).

Example 18

The same procedure was followed, using a dye bath containing a solution of the dye having the structure defined as follows:

5-amino-2-(p-aminoanilino)-benzenesulfonic→
    (gamma acid→m-phenylenediamine)$_2$ A good quality aluminum pigment was produced which corresponded to Munsell color 80.0, 4/2 (purple-blue purple).

Example 19

The same procedure was followed, using a dye bath containing a solution of copper phthalocyanine polysulfonic acid dye containing an average of 2 to 3 sulfonic acid groups per molecule. A good quality aluminum pigment was produced which corresponded to Munsell color 70.0, 5/6 (blue purple-blue).

Example 20

The same procedure was followed, using a dye bath containing a solution of the dye (C.I. 593) having a structure defined as follows:

Phenol←benzidine→H-acid→p-nitroaniline

A good quality green aluminum pigment was produced.

Lacquers were prepared by suspending 4 parts of the colored pigment particles in 100 parts of a clear methyl methacrylate base lacquer and sprayed on steel panels. The colored pigments were readily dispersed in the lacquer vehicle without the use of special dispersing agents. These lacquers produced durable colored coatings of excellent color-covering power having a metallized and two-tone effect. The light-fastness of the color corresponded to that obtained with the particular dye when used in other applications.

Uncolored aluminum particles, prepared as in Example 1 without any dye present in the hot aqueous bath, are useful for special purposes. Coating compositions were prepared by suspending 4 parts of the uncolored particles in 100 parts of colored lacquer or colored varnish. These provided tinted finishes having a pleasing aluminized appearance. In this case the color was in the vehicle rather than in the coating on the aluminum particles. Although similar finishes have been prepared with untreated aluminum powder, it has been difficult to avoid mottling or off-color streaks and special dispersing agents have been required. By this embodiment of the invention, uncolored aluminum powder is produced which will blend uniformly to produce the desired effects without special dispersing agents.

The previous examples have illustrated preferred procedures for preparing colored pigments. The following examples illustrate the effect on the products obtained of omitting the alkaline peroxide treatment altogether, or of omitting the buffer from the alkaline peroxide activation treatment. The aluminum powder used was of the size 100% through 325 mesh screen.

Example 21

A seven gram sample of aluminum powder was degreased for 30 minutes in 100 ml. benzene, filtered, and rinsed with two 25 ml. portions of acetone. A paste was made by wetting this material with 0.01% aqueous wetting agent and the material was transferred to a 60° C. aqueous dye bath containing 0.4% of a finely divided suspension of copper polychlorophthalocyanine (Pr. 483). The temperature was increased to 83° C. where an uncontrollable coloring activity was observed to progress. Here, as was generally found for this means of activation, the coloring reaction begins only at a high temperature. Once the reaction starts, it is very difficult to control; thus, many metal particles are completely consumed, many oxide particles are produced, and the vigor of reaction produces much foam containing metal particles which consequently are excluded from the coloring reaction and appear as uncolored particles in the final product. The material was recovered as described in Example 1. A poor quality aluminum pigment was produced which corresponded to Munsell color 55.0, 6/2.

*Example 22*

A seven gram sample of aluminum powder was degreased as above and cleaned with 50 ml. of 0.075 normal sodium hydroxide containing 0.01% of wetting agent. This was rinsed with two 25 ml. portions of water and suspended in a 50° C. aqueous dye bath containing 0.4% of a finely divided suspension of copper polychlorophthalocyanine (Pr. 483). The temperature was increased to 58° C., where coloring of the powder was observed to progress. The material was treated under these conditions for 10 minutes and then recovered as described in Example 1. A poor quality aluminum pigment was produced which corresponded to Munsell color 50.0, 7/4. As was generally found for this means of activation, the final product contained mostly particles colored over only a portion of their surface; the remainder consisted of gelatinous material that made difficult the recovery and drying of the product. It was also noted that the product continued to react with water after the dyeing process was completed and as the product was being washed. This pigment showed considerable tendency to cake during subsequent processing.

*Example 23*

A 15 g. sample was treated as in Example 1 except that no sodium carbonate was used; sodium hydroxide was used to adjust to pH 11.1. This material was dyed in an aqueous dye bath containing 0.4% of a finely-divided suspension of copper phthalocyanine (Pr. 481). The dyeing process occurred at 58 to 60° C. A fair quality aluminum pigment was produced that corresponded to Munsell color 72.5, 4/6. This pigment was better than that obtained using the procedure of Example 22; however, judging from the final color and its distribution over the particle surface, this treatment does not furnish the uniformity of activation that is obtained when a buffering agent is included in the treatment solution.

The previous examples have illustrated procedures for treating aluminum particles in the form of powder, particularly lamellar particles for the preparation of colored pigments. The following examples illustrate specific embodiments of the invention in the preparation of colored fibers and fibrils:

*Example 24*

Aluminum fiber having a diameter of 1 mil was degreased with benzene, rinsed with acetone, and dried. Further cleaning was effected by treatment for 3 minutes in a sodium hydroxide solution having a pH in the range of 11.5–12.0. The fiber was then rinsed with water and covered with a solution containing 50 parts by weight of water, 2.7 parts of sodium carbonate, and 2.9 parts of a 30% hydrogen peroxide solution; activation of the surface of the aluminum fibers was effected by stirring in contact with this solution for 8 minutes at a temperature of 28° C. The activated fibers were rinsed with water and exposed to the dye solution of Example 5 for 12 minutes at a temperature of 85° C. The fibers were then removed, rinsed with water and acetone, and dried. A desirable blue color was imparted to the fibers.

*Example 25*

Aluminum fiber having a diameter of 1 mil was cleaned as described in Example 24. The fiber was activated by stirring for 10 minutes at a temperature of 30° C. in a solution containing 53 parts by weight of water, 1.9 parts of sodium carbonate and 2.4 parts of a 30% hydrogen peroxide solution. The fibers were rinsed with water and treated in the dye bath of Example 2 for a period of 17 minutes at a temperature of 83° C., following which they were recovered, rinsed with water and acetone, and dried. By this treatment, a desirable purple color was imparted to the fibers.

*Example 26*

Aluminum fibers were cleaned and activated in accordance with the procedure described in Example 25. The fibers were treated in the dye bath of Example 20 for a period of 17 minutes at a temperature of 83° C. A good quality green aluminum fiber was produced.

*Example 27*

Flat aluminum fibrils were cleaned by treatment with benzene and a solution of sodium hydroxide, as described in Example 24. The fibrils were activated in a solution containing 80 parts by weight of water, 3.1 parts of sodium carbonate and 4.7 parts of a 30% solution of hydrogen peroxide. The activation treatment was continued with stirring for a period of 15 minutes at a temperature of 28° C. The particles were rinsed with water and treated in the dye bath of Example 20 for 21 minutes at a temperature of 85° C. Following this treatment, the fibrils were removed, washed with water and acetone, and dried. They exhibit a desirable light-green color.

*Example 28*

Flat aluminum fibrils were cleaned and activated in accordance with the procedure described in Example 27. The fibrils were then treated in water, recovered and dried. Microscopic examination indicates that these particles have a soft, thin oxide coating.

*Example 29*

Aluminum fiber having a diameter of 10 mils was degreased with benzene, and further cleaned by treatment in a sodium hydroxide solution. The fiber was activated in a solution containing 100 parts by weight of water, 4.1 parts of sodium carbonate, and 6.0 parts of a 30% solution of hydrogen peroxide. Treatment was continued for 20 minutes at a temperature of 34° C. The activated fiber was rinsed with water and treated in the dye bath of Example 2 for a period of 20 minutes at a temperature of 85° C. The fibers were removed, washed and dried. A good quality reddish-purple fiber was produced by this treatment.

*Example 30*

Aluminum fibers having a diameter of 5 mils were cleaned by treatment in a 0.1 normal sodium hydroxide solution and rinsed. The fibers were activated by immersion for 12 minutes at a temperature of 28° C. in a solution containing 200 parts by weight of water, 8 parts of sodium carbonate, and 11 parts of a 30% hydrogen peroxide solution. The fibers were rinsed, heated in water at a temperature of 80° C. for 15 minutes, recovered, and dried. A coating of a hydrous oxide of aluminum was found to have been formed on the filaments.

When the final water treatment was modified by the addition of "Monastral" Red B, prepared in accordance with the procedures specified in U.S. Patents 2,844,484, 2,844,485 and 2,844,581, good quality red aluminum fibers were produced.

Since many different embodiments of the invention may be made without departing from the spirit and scope thereof, it is to be understood that the invention is not limited by the specific illustrations except to the extent defined in the following claims.

What is claimed is:

1. The process for forming a coating on the surfaces of aluminum particles wherein the cross-sectional areas of the particles in planes perpendicular to the maximum dimension are at most 0.0003 square inch, which comprises activating the aluminum particles in an aqueous alkaline peroxide bath containing the equivalent of ½ to 2% of hydrogen peroxide, at a pH of about 11 and at a temperature below 40° C. to form an incipient coating of hydrous aluminum oxide, and subsequently treating the activated particles in an aqueous bath at pH 6 to 9.5 and from 55° to 75° C. for particles having maximum dimensions of less than 0.125 inch, and up to 95° C. for larger maximum dimensions, to form a coating on the surfaces of the particles, the incipient coating on said activated particles being less than 20% of the weight of the coating produced by said subsequent treatment.

2. The process defined in claim 1 wherein said step of treating the activated particles in an aqueous bath at a pH of 6 to 9.5 and from 55° to 75° C. for particles having maximum dimensions of less than 0.125 inch, and up to 95° C. for larger maximum dimensions is in a dye bath to form a colored coating.

3. A process as defined in claim 2 wherein said dye bath is a suspension of finely-divided water-insoluble dye.

References Cited in the file of this patent

UNITED STATES PATENTS

| | | |
|---|---|---|
| 1,946,148 | Tosterud | Feb. 6, 1948 |
| 2,778,790 | Sobol | Jan. 22, 1957 |
| 2,785,098 | Cunningham | Mar. 12, 1957 |
| 2,819,192 | Young | Jan. 7, 1958 |
| 2,859,148 | Altenpohl | Nov. 4, 1958 |

FOREIGN PATENTS

| | | |
|---|---|---|
| 489,574 | Great Britain | July 29, 1938 |